Figure 2:
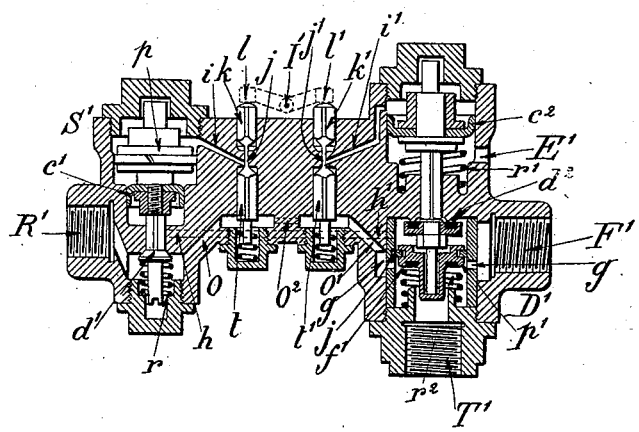

(No Model.) 3 Sheets—Sheet 1.

F. CHAPSAL.
ELECTROPNEUMATIC BRAKE.

No. 577,526. Patented Feb. 23, 1897.

WITNESSES:
Fred White
Thomas F. Wallace

INVENTOR:
François Chapsal,
By his Attorneys:

(No Model.) 3 Sheets—Sheet 2.

F. CHAPSAL.
ELECTROPNEUMATIC BRAKE.

No. 577,526. Patented Feb. 23, 1897.

WITNESSES:
Fred White
Thomas F. Wallace

INVENTOR:
François Chapsal,
By his Attorneys:
Arthur C. Fraser & Co (No Model.) 3 Sheets—Sheet 3.
F. CHAPSAL.
ELECTROPNEUMATIC BRAKE.
No. 577,526. Patented Feb. 23, 1897.
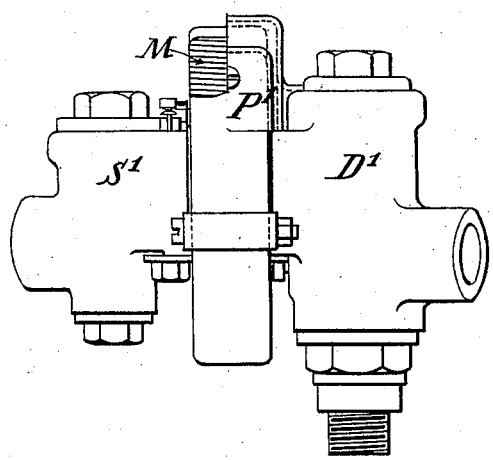
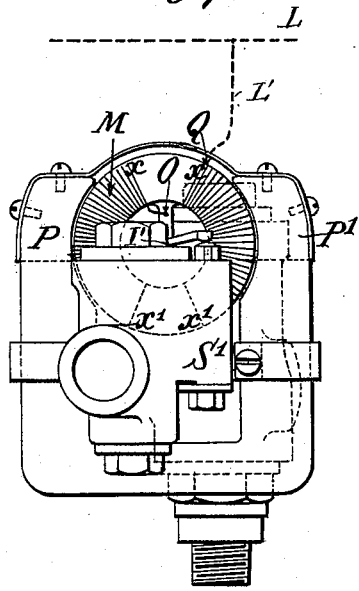
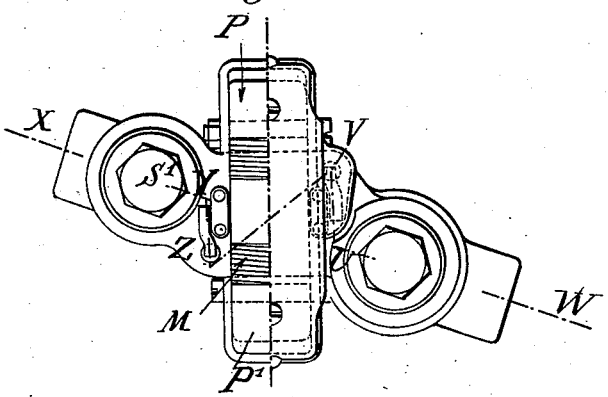
WITNESSES:
Fred White
Thomas F. Wallace
INVENTOR:
François Chapsal,
By his Attorneys:

UNITED STATES PATENT OFFICE.

FRANÇOIS CHAPSAL, OF PARIS, FRANCE.

ELECTROPNEUMATIC BRAKE.

SPECIFICATION forming part of Letters Patent No. 577,526, dated February 23, 1897.

Application filed September 26, 1896. Serial No. 607,089. (No model.)

*To all whom it may concern:*

Be it known that I, FRANÇOIS CHAPSAL, a citizen of the Republic of France, residing in Paris, France, have invented certain new and useful Improvements in Electropneumatic Brakes, of which the following is a specification.

This invention relates to brake systems for railway-vehicles, and especially to air-pressure brake apparatus in which the application and release of the brakes are controlled both electrically and pneumatically by the engineer's valve, and aims to provide certain improvements in such apparatus, which will be hereinafter fully set forth.

In my prior patent, No. 555,075, dated February 25, 1896, I have described an electropneumatic application permitting the addition to the pneumatic-brake controlling system of an electric controlling system, both operated by the same maneuver of the engineer's valve, whereby the electric action precedes the pneumatic action and ceases when the latter has had time to itself produce the braking or releasing action. I thus secure rapid and simultaneous braking of all the cars of a train independent of the number of cars and diminish the time required to make emergency stops, and in case of moderate applications I assure a great moderation, as well for the braking as for the releasing, by employing the electric action alone; also I avoid, by means of the electric release, the accidental applications due to breaking of the couplings or pipes of the system and render impossible the untimely application of the brakes to individual cars and suppress all the causes of non-action of the brakes pneumatically, due to any obstruction in the train-pipe or to analogous causes, putting in the control of the engineer two brake-controllers actuated simultaneously by the same movement of his valve. The arrangement I have described as an example of said system was especially applicable to the Westinghouse compressed-air brake, wherein I utilized the triple valve or distributer as an automatic commutator for the braking and releasing to exactly regulate the discharge of air at each moderate braking and secure the graduation of application of the brake. I obtained thereby a very gradual operation by the electric release, permitting the release of air to go directly from the brake-cylinder to the exterior. The release-valve was so constructed that the electric releasing could be effected after a complete application, closing direct communication between the auxiliary reservoir and the brake-cylinder, or by the complete falling of the triple valve in the usual way without the loss of any air from the auxiliary reservoir.

The employment of the triple valves as automatic commutators enabled me to obtain for the braking the theoretical slowness or graduation of application of the Westinghouse brake and a much greater slowness for the release; but my said electrical operating means had the disadvantage that the intensity of the application of the brake depended on the sensitiveness of the triple valve and its secondary piston under the exhaust of air from the train-pipe valve by the electric braking-valve, that such exhaust wasted the air-pressure in the train-pipe.

My present invention aims to improve the system described in my said patent, to the end that its operation shall be normally rendered independent of the sensibility of the triple valve and to modify the brake apparatus so as to obtain continued feed to the auxiliary reservoirs during braking, and to simplify the system, so that one conducting-wire will be sufficient.

To this end in carrying out my present invention I provide various improvements in the arrangement and operation of the system, an improved construction of triple valve, improved electric brake and release valves, improved electromagnetic means for operating these, and an improved electric switch for the engineer's valve, all of which will be more fully hereinafter set forth with reference to the accompanying drawings, in which—

Figure 1:
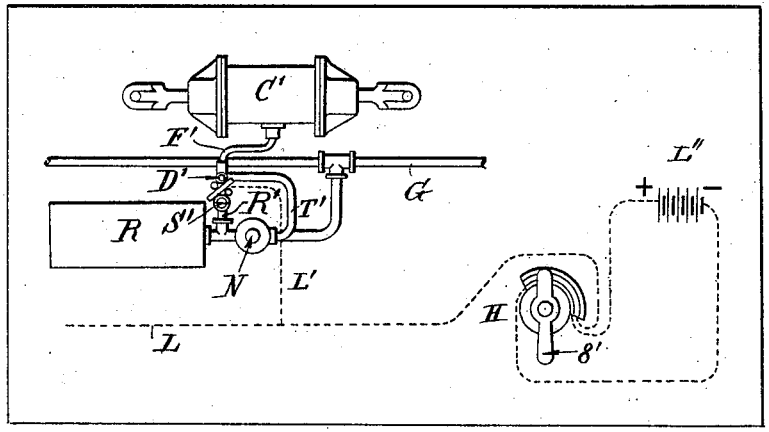
Figure 3:
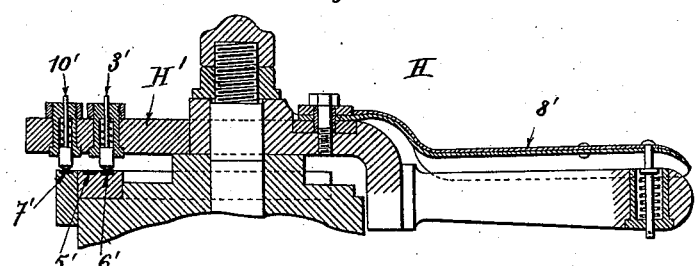

Figure 1 is a diagrammatic view showing the engineer's valve and commutator, electric connections, the auxiliary reservoir, triple valve, brake-reservoir, electric braking and releasing valves, and the train-pipe and connections. Fig. 2 is a longitudinal section of the braking and release valve, cut on the planes of the lines X Y Z V U in Fig. 8. Fig. 3 is a fragmentary vertical section of the preferred form of my improved combined electrical and pneumatic engineer's valve. Fig.

Figure 5:
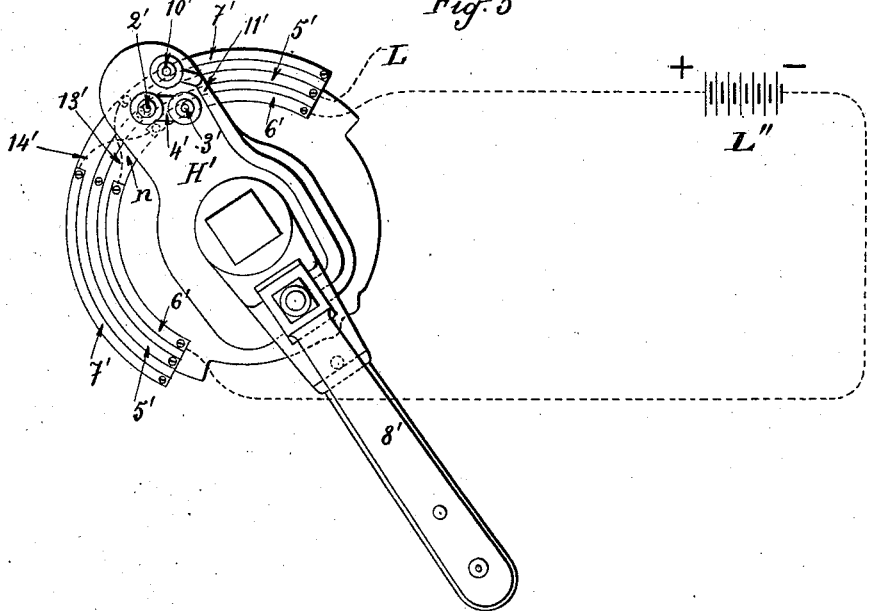

4 is a diagrammatic plan view thereof in the braking position. Fig. 5 is a similar view in the releasing position. Fig. 6 is a side elevation of the preferred form of my improved electrical braking and release valve. Fig. 7 is an end elevation thereof. Fig. 8 is a plan view thereof.

Referring to the drawings, let R represent the auxiliary reservoir, N the triple valve or distributer, C' the brake-cylinder, G the train-pipe, H the engineer's valve, S' the electrical braking-valve, and D' the electrical releasing-valve of the preferred arrangement of my present improvements.

I have always thought that there should be means at the triple valve for both ordinary and rapid acting brakes for permitting feed to the auxiliary reservoir and for effecting gradual applications, and I have endeavored to discover a direct electric operator permitting, for braking, the sending of the air directly from the auxiliary reservoir into the brake-cylinder and the holding of it there as well when the triple valve stands immovable in the releasing position and without requiring the pneumatic operation for braking or releasing. To this end I have devised the following system, which assures all the above advantages I have sought and another great advantage of requiring the use of only one line-wire instead of two and dispensing with the commutator on the triple valve, reducing the line connections, which may always in practice cause difficulty in operation, and having only one double electric valve per car instead of the two distinct apparatus shown in my said patent. I replace principally to attain this end the electromagnets of the separate braking and releasing apparatus by a single electromagnet or motor having a double action, preferably employing a magnet of circular form, using a Pacinotti, Gramme, Siemens, or other ring, arranged, as shown in Fig. 7, between the poles of a magnet. This ring is the ring M in Figs. 6, 7, and 8, and the poles are lettered P P'. The ring oscillates around an axis I', Figs. 7 and 2, and carries a double lever $l$ $l'$, acting on its opposite ends, respectively, on pin-valves $k$ $k'$, which by the aid of extension-rods $j$ $j'$ act on two other pin-valves $t$ $t'$, which are the equivalents of the pin-valves of the electromagnets of the braking and releasing valves of my said patent of February 25, 1896. One will see, therefore, that in place of actuating these two pin-valves by the aid of separate electromagnets I now actuate them by a balanceed one by the aid of alternative movements of the ring obtained by reversing the current in the line-wire.

The one extremity Q of the coil of the ring mounted in derivation, as shown in Fig. 7, is connected to the single line-wire L L', which extends the length of the train, and the other extremity O is connected to the middle of the ring and thereby to earth.

The winding of the wire on the ring, which, it will be understood, has no commutator for greater simplicity, is interrupted on two small segments $x$ $x$ and $x'$ $x'$, disposed at each side of its diameter perpendicular to the line of the pole-pieces of the magnet, which segments correspond to the total extent of the movement of the ring in both directions.

Figure 4:
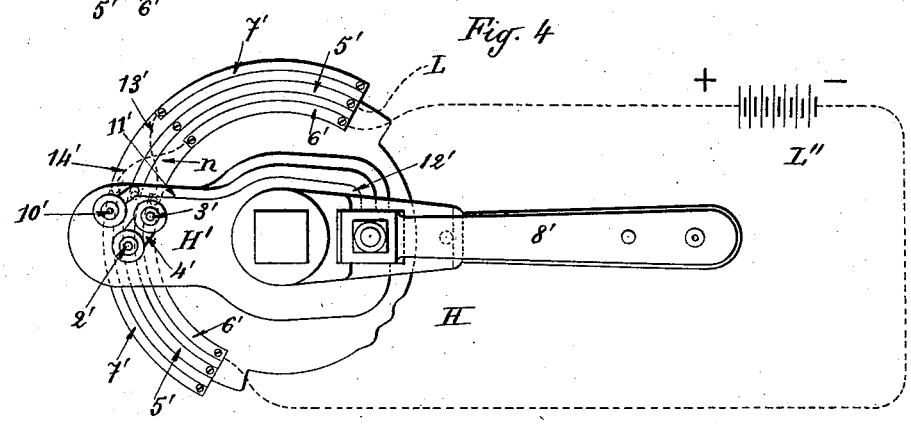

The sending, the termination, and the reversal of the current are effected by the aid of the engineer's valve H, of which the handle and commutator are shown in Figs. 3, 4, and 5. This valve carries an insulated extension H', provided with two metal contacts 2' and 3', electrically connected by a transverse conductor 4'. These two contacts bear on two arc-shaped conducting-sectors 5' and 6'. The extremity of the sector 5' corresponds to the line L, whereas those of the sector 6' are connected to the opposite poles of the battery or other source of electric energy L'', the two sectors 6' being divided into separate segments by an insulated part $n$.

On a third sector 7', likewise divided into two segments by said insulation, another contact 10' bears, which is connected by an insulated conductor 11' 12' with the handle of the valve, and this by the intermediation of a yielding lever 8', which by the pressure of the hand on the lever makes contact with the metallic part of the valve, and through it to earth. One can thus put one or the other of the poles of the battery in connection with earth by pressing the yielding lever 8' into contact with the handle of the valve, while the other is connected to the line by reason of cross-conductors 13' and 14' between the respective segments of the sectors 6' and 7'. The space between the segments of the sectors 7' and 6' corresponds to the neutral position of the valve. There also exists a small insulation toward both positions of movement, that is to say, this insulated space is wide enough to permit a slight movement of the valve either way from the neutral position before the contacts make electrical connection with the sectors of the divided segments. It is apparent, then, that when the valve is placed in the position for electric braking shown in Fig. 4, and when the contact-lever 8' is pressed into contact with the handle, there will pass through the line a current of a predetermined character, since the circuit is then closed on the one part through the handle of the engineer's valve to earth and on the other part through the terminal wire O of the ring M and the metal of the train-pipe connections to earth. In this position of the engineer's valve and commutator the ring M will be magnetized and caused to swing toward the left on its axis, and will thus, through the depression of its lever $l$, operate the brake-valve S'.

When the engineer's valve is turned to the neutral position, no current will traverse the line, since the circuit will be broken, and the ring M will return to its normal position, thus discontinuing the operation of the brake-valve. Then by placing the engineer's valve in the position for electric releasing (shown in Fig. 5) there will pass through the line, upon the depression of the lever 8', a current which is the reverse of that before passing and which traverses the same circuit as the previous current. This current will therefore give an opposite magnetism to the ring M, causing the latter to turn toward the right, whereby, through the depression of its lever $l'$, it will cause the releasing-valve to operate. Upon return of the engineer's valve to neutral position the circuit will be broken and the ring will resume its normal position, thus discontinuing the operation of the releasing-valve.

The arrangement of the preferred form of my improved system is shown diagrammatically in Fig. 1, which shows the battery, engineer's valve, the line, and the brake connections, and the details of construction of the preferred form of the improved valve are shown best in Figs. 2, 6, 7, and 8.

Referring especially to Fig. 2, the improved electrical brake-valve is represented at $S'$ and is composed of a movable system comprising a piston $p$, a cupped piston $c'$, a tappet-valve $d'$, and a spring $r$, acting to hold the latter toward its seat. The tube $R'$ communicates with the auxiliary reservoir R, the duct O communicates with the tappet-valve $t$ and supplies reservoir-pressure thereto, and the duct $i$ leads from this valve to the chamber above the piston $p$.

The improved electrical releasing-valve (lettered $D'$) is shown in Fig. 2 as composed of a movable system comprising a cupped piston $c^2$, raised by a spring $r'$, a tappet-valve $d^2$, another tappet-valve $f'$, carrying a packed piston-valve $p'$, and a spring $r^2$, holding both away from their seats.

The tube $T'$ communicates with the triple valve N, Fig. 1, and the tube $F'$ communicates with the brake-cylinder $C'$, Fig. 1. The piston $p'$ moves in a metal chamber, through which are pierced a series of orifices leading to a circular chamber $g$. This chamber is connected by a duct $O'$ with the chamber of the valve $t'$ and also is in communication, through the tube $F'$, with the brake-cylinder. The duct $i'$ leads from the tappet $t'$ to the chamber above the valve $c^2$. A port $E'$ opens from below this valve to the outer air.

A conduit $h\ h'$, which opens above the piston $p'$, (indicated in dotted lines in Fig. 2,) makes communication between the brake-cylinder and the auxiliary reservoir through the intermediation of the brake-valve. The general operation of these valves is as follows: When the engineer's valve is moved to the position for moderate electric braking, the ring moves toward the left, and the lever $l$ closes the tappet-valve $k$ and opens the tappet-valve $t$. Immediately the air from the auxiliary reservoir passes through pipe $R'$ and the ducts O and $i$ to above the piston $p$ and depresses it. The piston in moving downward unseats the tappet $d'$, and the air from the reservoir passes this tappet and across through the duct $h\ h'$ to above the piston-valve $p'$, depressing the latter until it opens the ports $g$ and closes the valve $f'$, so that the pressure can pass through the ports and the tube $F'$ to the brake-cylinder. The air-pressure in the casing containing the piston $p'$ maintains the valve $d^2$ seated. Thus a moderate feed is permitted from the auxiliary reservoir to the brake-cylinder, which continues so long as the ring is held tilted to the left by the continuation of the current energizing it.

When the engineer's valve is moved to the neutral position, the ring returns to its middle position and the tappet $t$ closes, the tappet $k$ at the same time opening and permitting the air which was above the piston $p$ to escape to the exterior. The air-pressure under the valve $c'$ at once lifts the latter, permitting the valve $d'$ to seat under the influence of the spring $r$, thus closing all communication between the reservoir and brake-cylinder and leaving the air-pressure which has passed into the brake-cylinder therein.

In moving the engineer's valve successively from the brake-applying to the neutral position one can make a direct flow of air from the reservoir to the brake-cylinder independently of the triple valve if the tube $R'$ is connected to the reservoir directly, as shown in Fig. 1, and this feed can be regulated in extent to quantities as small as desired.

If the engineer's valve is moved to the position for electric releasing, the direction of the current is reversed, and the ring M turns toward the right, depressing its lever $l'$ until the valve $k'$ is closed and the valve $t'$ open. Immediately the air from the brake-cylinder which was in the chamber $g$ passes through the duct $O'$, past the valve $t'$, and through the duct $i'$ to above the piston $c^2$, depressing the latter. This piston in moving down depresses and unseats the tappet-valve $d^2$, thereby permitting the air from the brake-cylinder to escape to the exterior past this valve and through the orifice $E'$. If the engineer's valve is moved to the neutral position, the ring returns to its normal position, the valve $t'$ closes, and the valve $k'$ opens, permitting the air above the piston $c^2$ to escape to the exterior, so that this piston can rise to its normal position under the action of its spring $r'$, the valve $d^2$ can seat, and further escape from the brake-cylinder will be prevented. By successively moving the valve from the releasing to the neutral position one can release the air from the brake-cylinder in proportions as small as desired. It will be therefore seen that in this manner and with a single wire I can effect the electrical operation of braking and releasing with great graduation; also that I can take the air directly from the auxiliary reservoir to the brake-cylinder, and that I can discharge the air directly from the latter.

In the case of a combined electric and pneumatic application the piston $p'$ finds itself with the reservoir-pressure acting against both its upper and lower faces, in which case it will occupy the position shown in Fig. 2 by the reason of its lifting-spring $r^2$, and one can always make the pneumatic release of the same in case of interruption of the current. The small groove $j$ is provided in the cylinder of the piston $p'$ with the object of permitting, in case of need, a leakage from the space above this piston pending a pneumatic release.

It will be seen that during all the duration of moderate electric braking I obtain an absolute feed to the reservoir by the triple valve, which is not moved, and which is always at its position of release, which is indispensable on certain lines having steep grades. On the other hand, when, instead of making the applications and the releases electrically only, I put the engineer's valve at the extreme application or the extreme release position the two brake-operating provisions act together and independently the one of the other by the same movement of the engineer's valve, as has been explained in my said patent.

It may be remarked, finally, that with the arrangement described one will be able to release fully the brakes, even in case of the rupture of the train-pipe or reservoir. To avoid unnecessary loss of air and maintain the auxiliary reservoirs in such control as to be able to still make stops when there is a break in the train-pipe, it will suffice to suppress the conduit $O'$ of the releasing-valve and to substitute for it the conduit $O^2$, (indicated in dotted lines on Fig. 2,) and which makes communication between the two chambers situated under the tappet-valves $t\,t'$. Under this condition the emptying from the cylinder can be made without loss of air from the reservoir.

What I claim is—

1. In electropneumatic brakes, the combination with an auxiliary reservoir, distributer, brake-cylinder, and an electric brake-valve and an electric release-valve, of electromagnetic means operating one of said valves when moved in one direction, and the other of said valves when moved in the other direction, an electric circuit for energizing said means, and a commutator for reversing the current on said circuit.

2. The combination with a pneumatic brake comprising a distributer, an auxiliary reservoir, and a brake-cylinder, of an electric brake-controlling apparatus, an engineer's valve for operating the brakes pneumatically, a commutator operated by said valve for operating the brakes electrically, and an electric switch on said valve for closing said circuit to control electric operation.

3. For electrically-operated pneumatic brakes, the improved commutator H comprising segments $5'$, $6'$, $7'$, conductors $13'$, $14'$, contacts $2'$, $3'$ and $10'$, a line-wire connected to said segments $5'$, and means for connecting the opposite terminals of a source of electric energy to said segments $6'$ and $7'$.

4. For electrically-operated pneumatic brakes, the improved commutator H comprising segments $5'$, $6'$, $7'$, conductors $13'$, $14'$, contacts $2'$, $3'$ and $10'$, a line-wire connected to said segments $5'$, means for connecting the opposite terminals of a source of electric energy to said segments $6'$ and $7'$, and a handle-switch $8'$.

5. The combination with a pneumatic-brake system, of an electrically-operated brake-valve therefor comprising an oscillating electromagnet, a single line-wire leading thereto, means for sending reverse currents over said wire, and valves operated by the oscillation of said magnet.

6. An electrically-operated valve for pneumatic-brake systems comprising a magnetic ring rotatively mounted on an axis between pole-pieces, means for sending reverse currents over said ring, and thereby oppositely energizing it and causing it to turn in one direction or another, and separate valves operated by the opposite movements of said ring.

In witness whereof I have hereunto signed my name in the presence of two subscribing witnesses.

FRANÇOIS CHAPSAL.

Witnesses:
EDWARD P. MACLEAN,
ALEXANDRE MATHIEU.